US008960565B2

(12) United States Patent
Rohner et al.

(10) Patent No.: US 8,960,565 B2
(45) Date of Patent: Feb. 24, 2015

(54) APPARATUS FOR HOT WATER PRESSURE WASHER WITH AN AUTOMATIC BURNER COOL-DOWN

(71) Applicants: Jo Ann Rohner, Richland, WA (US); Robert Rohner, Richland, WA (US)

(72) Inventors: Jo Ann Rohner, Richland, WA (US); Robert Rohner, Richland, WA (US)

(73) Assignee: Pressure Washers Northwest, LLC, Pasco, WA (US)

( * ) Notice: Subject to any disclaimer, the term of this patent is extended or adjusted under 35 U.S.C. 154(b) by 18 days.

(21) Appl. No.: 13/969,473

(22) Filed: Aug. 16, 2013

(65) Prior Publication Data

US 2014/0048140 A1 Feb. 20, 2014

Related U.S. Application Data

(60) Provisional application No. 61/683,788, filed on Aug. 16, 2012.

(51) Int. Cl.

| | |
|---|---|
| ***B05B 1/24*** | (2006.01) |
| ***B05B 17/04*** | (2006.01) |
| ***B05C 1/00*** | (2006.01) |
| ***A01G 27/00*** | (2006.01) |
| ***B08B 3/02*** | (2006.01) |
| ***F04B 17/03*** | (2006.01) |
| ***F24H 1/00*** | (2006.01) |

(52) U.S. Cl.

CPC . *B08B 3/02* (2013.01); *B08B 3/026* (2013.01); *F04B 17/03* (2013.01); *F24H 1/00* (2013.01)

USPC ............... 239/13; 239/70; 239/128; 239/135; 239/139; 137/334; 137/335

(58) Field of Classification Search

USPC ........ 239/13, 67, 70, 128, 135, 139; 137/334, 137/335

See application file for complete search history.

(56) References Cited

U.S. PATENT DOCUMENTS

| | | | | |
|---|---|---|---|---|
| 2,295,228 | A * | 9/1942 | Malsbary et al. | 122/448.1 |
| 3,814,321 | A * | 6/1974 | Mulholland et al. | 239/135 |
| 4,697,464 | A * | 10/1987 | Martin | 73/866.3 |
| 5,662,269 | A * | 9/1997 | Francis | 239/70 |
| 6,435,424 | B1 * | 8/2002 | Pauley et al. | 239/128 |

* cited by examiner

*Primary Examiner* — Ryan Reis

(57) ABSTRACT

A hot water pressure washer with an automatic burner cool-down includes a water inlet assembly, a low pressure water supply assembly, a coil outlet assembly, a control system, and other related components which are required for the functionality of the pressure washer. A shut-down timer of the control system shut down a power source so that the pressure washer can be automatically shut down through the control system when the pressure washer is not operated. Then a cool-down timer of the control system efficiently cools down a heating coil of a burner assembly. The cool-down timer activates the water inlet assembly, the low pressure water supply assembly and the coil outlet assembly through a pair of solenoid valves in order to cool down the heating coil, where the thermal energy within the heating coil is removed from a phase change of water into water vapor and convection.

15 Claims, 13 Drawing Sheets

APPARATUS FOR HOT WATER PRESSURE WASHER WITH AN AUTOMATIC BURNER COOL-DOWN

The current application claims a priority to the U.S. Provisional Patent application Ser. No. 61/683,788 filed on Aug. 16, 2012.

FIELD OF THE INVENTION

The present invention relates generally to pressure cleaning systems, and more particularly to a control safety circuit for a steam cleaner and/or hot water pressure washer which incorporates predetermined automatic depressurization and cools down the heating coil. The present invention utilizes time delays on shutdown to minimize the possibility of temperature extremes and thus damage to the system without additional operator attention.

BACKGROUND OF THE INVENTION

Pressurized steam cleaners and hot water pressure washers are utilized in a variety of situations for cleaning purposes. Such systems generally include a pump, unloading device, a burner or electrical heating elements and discharge under pressure through the trigger gun and nozzle of a wand. Equipment of this type is controlled primarily by switching the pump and heater on and then manipulating the wand as necessary to spray the object being cleaned.

A pressure washer includes an electric motor or an engine driven high pressure liquid pump. Generally, the pump has a water inlet which is connected through a hose to a water main. Optionally, a suitable cleaning solution may be mixed with the water either at the pump or upstream or downstream from the pump. The pump increases pressure of the water or other liquid from a relative low inlet pressure to a significantly higher outlet pressure. The high pressure water is delivered to a wand for directing a water spray at a surface to be cleaned. Normally, the wand includes a manually operated trigger valve for turning the water flow on and off, and a nozzle which shapes the spray pattern and determines the velocity of the high pressure spray. When the valve is closed, the pump can be subjected to a high static load. An unloader valve may be provided for allowing the pump to continue to operate by recirculating the water through the unloader valve back to the inlet to the pump. However, a typical unloader valve may still place a sufficient back load on the pump to cause excess heat buildup and excess wear on the motor and pump. When the pump is driven by an electric motor, a pressure responsive switch may be provided to shutdown the pump and motor either directly or via a timer when the water discharge valve (trigger gun) is closed to prevent excess wear on the motor and pump, excess heat generation and unnecessary energy consumption.

While these methodologies exist to protect the engine/motor and pump, they do not address the high temperature and high pressure water trapped between the unloader and trigger gun. The burner heating coil may still be at 800° F. and continues to transfer thermal energy to the trapped water inside the coil. This energy transfer results in a temperature rise of the trapped water and a corresponding pressure increase in the trapped body of water. This increase in temperature and pressure serves to damage components and shorten their life expectancy. Currently there is no existing art to relieve the high pressure trapped between the unloader and trigger gun, nor cool down the burner heating coil.

It is an object of the present invention to introduce an apparatus for steam cleaning and hot water pressure washing that comprise a control safety circuit for the steam cleaner and/or hot water pressure washer which incorporates predetermined automatic depressurization and cool down of the heating coil.

DETAIL DESCRIPTIONS OF THE INVENTION

All illustrations of the drawings are for the purpose of describing selected versions of the present invention and are not intended to limit the scope of the present invention.

Figure 1:
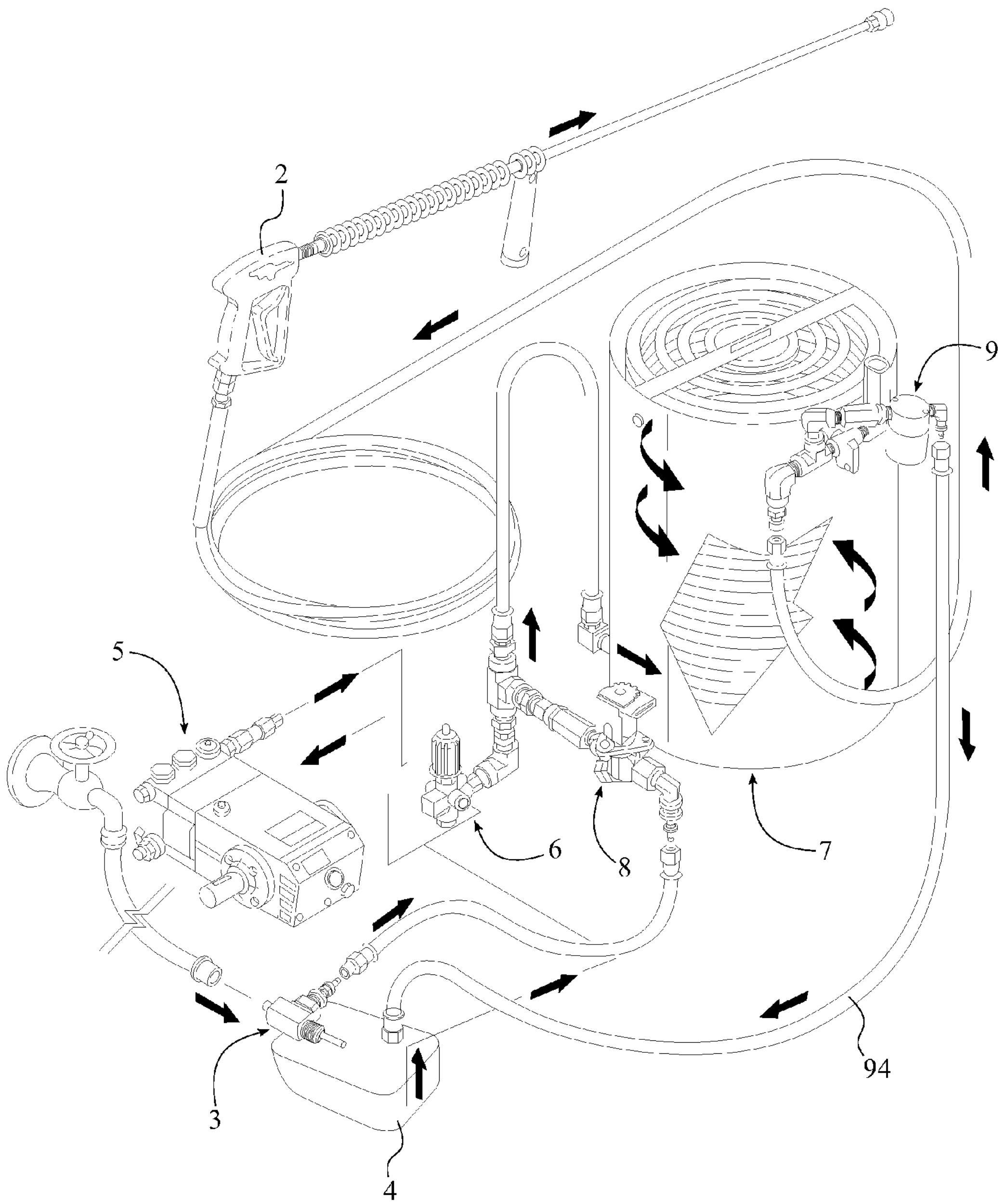
FIG. 1 is a perspective view of the present invention without the control system and the power source.
Figure 10:
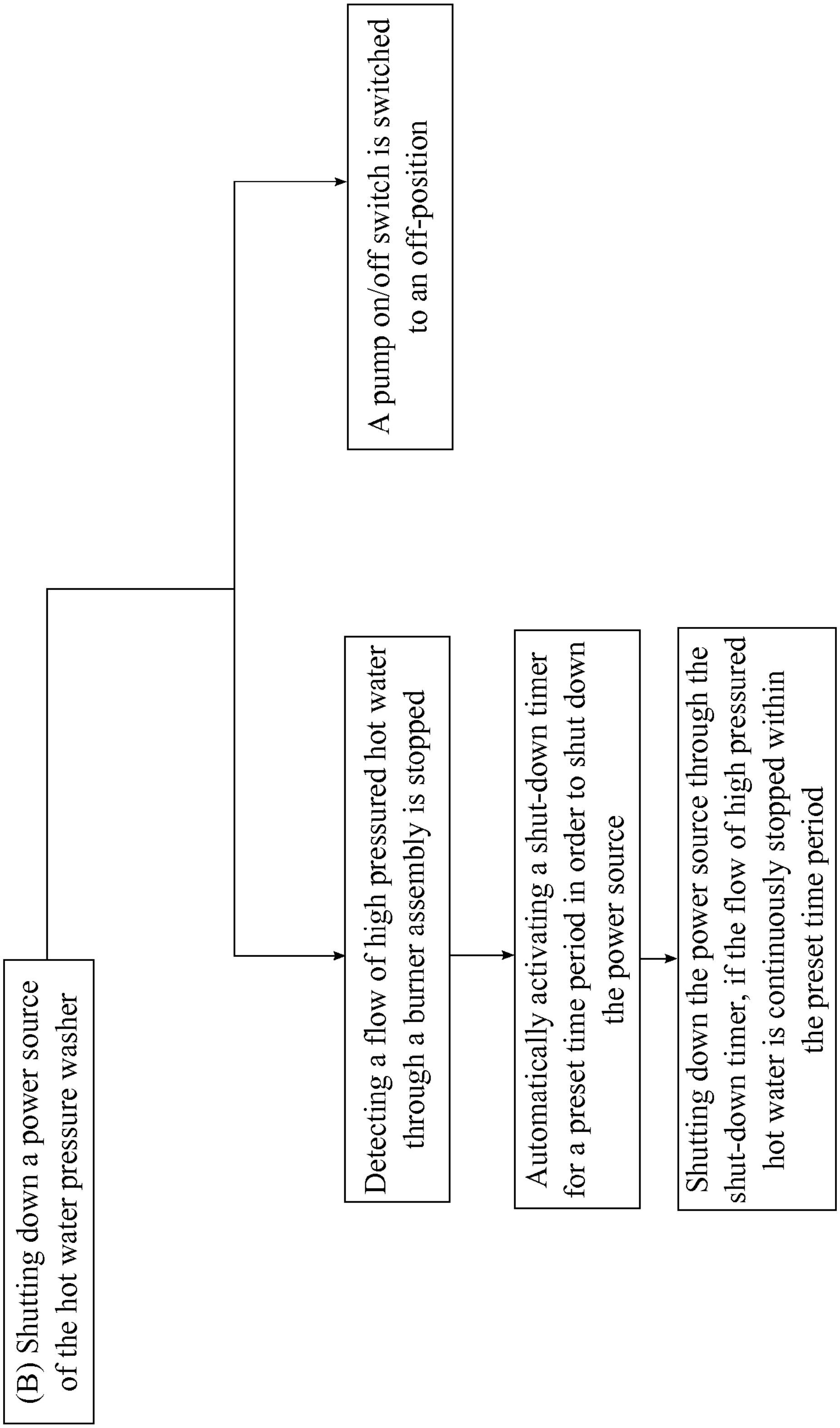
FIG. 10 is a basic flow chart illustrating the two shutting down methods of the present invention within the overall process.

In reference to FIG. 1 and FIG. 10, the present invention is an apparatus for hot water pressure washer with an automatic burner cool-down, where the present invention comprises a power source 1, a spray gun 2, a water inlet assembly 3, a pump 5, an unloader valve 6, a burner assembly 7, a low pressure water supply assembly 8, a coil outlet assembly 9, a float tank 4, and a control system 10. The present invention intakes a flow of low pressure cold water from a garden hose or any other similar water outlet and outputs a flow of high pressure hot water through the spray gun 2 so that the users of the present invention can clean a variety of surfaces. According to the control system 10 and the other associated hardware of the present invention, the present invention is able to relieve pressure and efficiently cool down a heating coil 72 of the burner assembly 7 for a predetermined period of time after the pump 5 is shutdown either manually or via the control system 10.

Figure 2:
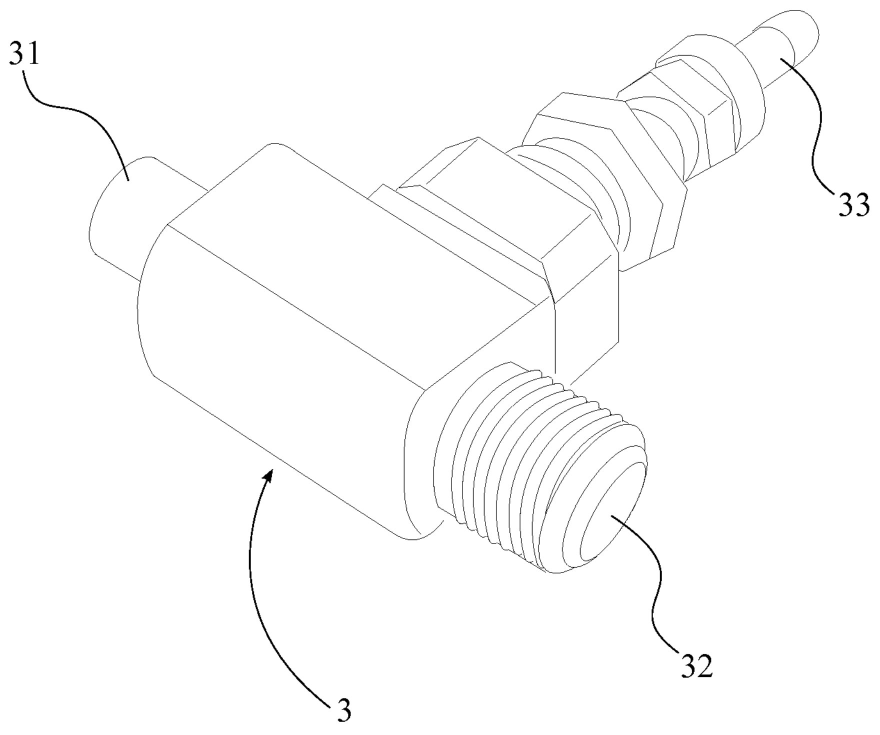
FIG. 2 is a perspective view of the water inlet assembly of the present invention.

In reference to FIG. 1 and FIG. 2, the water inlet assembly 3 of the present invention intakes the flow of low pressure cold water from the garden hose and discharges into the present invention, where the water inlet assembly 3 is a valve with three openings that comprises a water inlet 31, a tank outlet 32, and a low pressure outlet 33. The water inlet 31, the tank outlet 32, and the low pressure outlet 33 are positioned on the water inlet assembly 3 and complete the water inlet assembly 3. More specifically, the garden hose is in fluid communication with the water inlet 31 so that the flow of low pressure cold water is able to enter into the water inlet assembly 3. The water inlet assembly 3 preferably pressurizes the flow of water from the garden hose at 40-80 pounds per square inch (psi) so that the flow of water exits though the tank outlet 32 and the low pressure outlet 33 with the generated pressure. The tank outlet 32 is in fluid communication with the float tank 4, and the low pressure outlet 33 is in fluid communication with the low pressure water supply assembly 8. The float tank 4 of the present invention provides a storage vessel for the flow of low pressure cold water and is in fluid communication with the pump 5.

Figure 3:
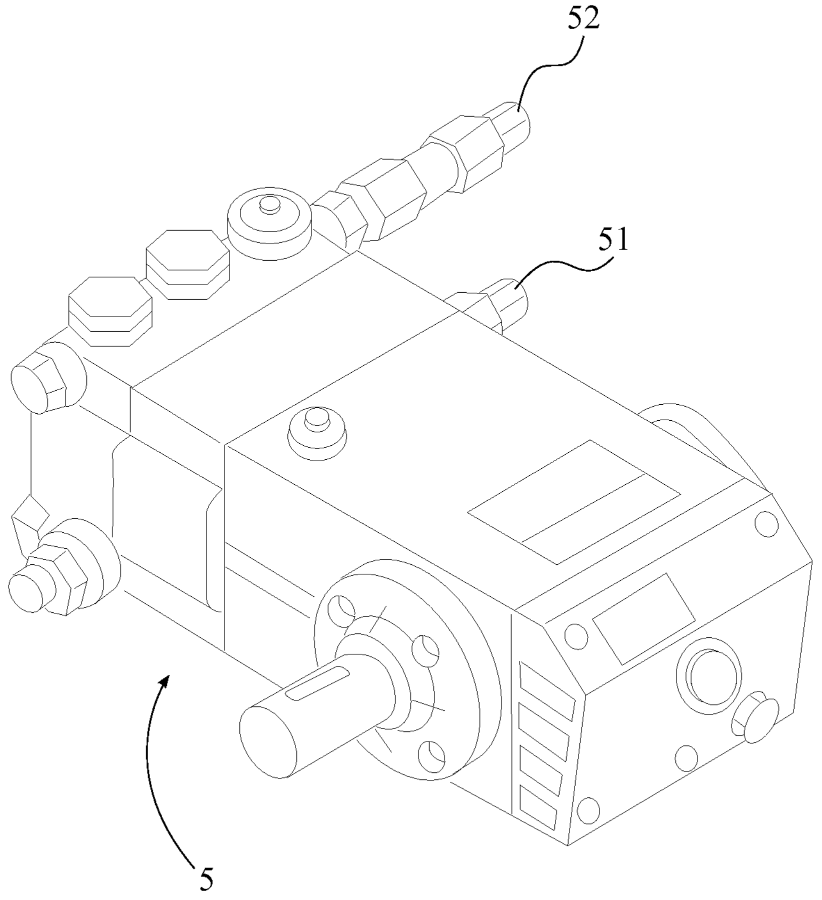
FIG. 3 is a perspective view of the pump of the present invention.

In reference to FIG. 1 and FIG. 3, the pump 5 comprises a pump inlet 51 and a pump outlet 52, where the pump 5 converts the flow of low pressure cold water from the float tank 4 into a flow of high pressure cold water. More specifically, the pump inlet 51 is in fluid communication with the float tank 4 in such way that the flow of low pressure cold water flows into the pump 5 when the pump 5 is operational. Then the pump 5 is able to convert the flow of low pressure cold water into the flow of high pressure cold water so that the flow of high pressure cold water can be transported into the unloader valve 6 through the pump outlet 52.

Figure 4:
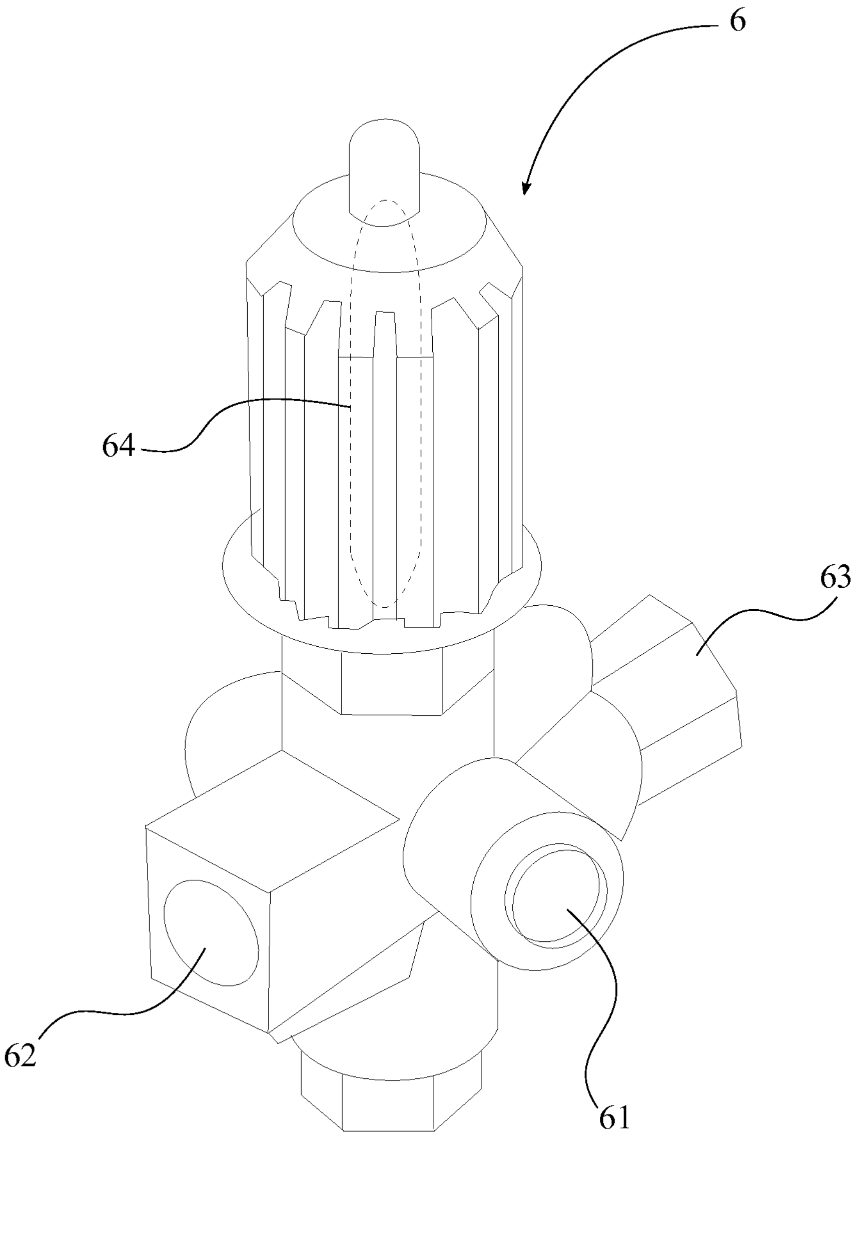
FIG. 4 is a perspective view of the unloader valve of the present invention.

In reference to FIG. 1 and FIG. 4, the unloader valve 6 functions as a pressure regulator and directs the flow of high pressure cold water within the present invention. The unloader valve 6 comprises a bypass port 61, an inlet valve port 62, and an outlet valve port 63, where the bypass port 61, the inlet valve port 62, and the outlet valve port 63 are positioned on the unloader valve 6. As for the proper functionality of the unloader valve 6, the pump outlet 52 is in fluid communication with the inlet valve port 62; the bypass port 61 is in fluid communication with the pump inlet 51; and the outlet valve port 63 is in fluid communication with a bottom inlet 73 of the burner assembly 7, wherein the bottom inlet 73 is explained in hereafter. When the present invention is in operation, the unloader valve 6 directs the flow of high pressure cold water into the next stage of the present invention so that the flow of high pressure hot water can exit out from spray gun 2. More specifically, the flow of high pressure cold water from the pump outlet 52 travels through the inlet valve port 62 and the outlet valve port 63 and into the bottom inlet 73. When the flow of high pressure hot water stops following through the spray gun 2, the unloader valve 6 diverts the flow of cold water back to the pump inlet 51 in such way that the flow of cold water recirculates in between the pump 5 and the unloader valve 6. The recirculation of the flow of cold water minimizes the back load on the pump, excess heat buildup on the pump, and excess wear on the pump. More specifically, the flow of cold water from the pump outlet 52 travels into the inlet valve port 62, through the bypass port 61, and back into the pump inlet 51. The unloader valve 6 further comprises a pressure responsive switch 64 which is only activated due to the pressure buildup when the flow of cold water recirculates in between the pump 5 and the unloader valve 6, and the pressure responsive switch 64 is electrically connected with the control system 10 of the present invention.

Figure 5:
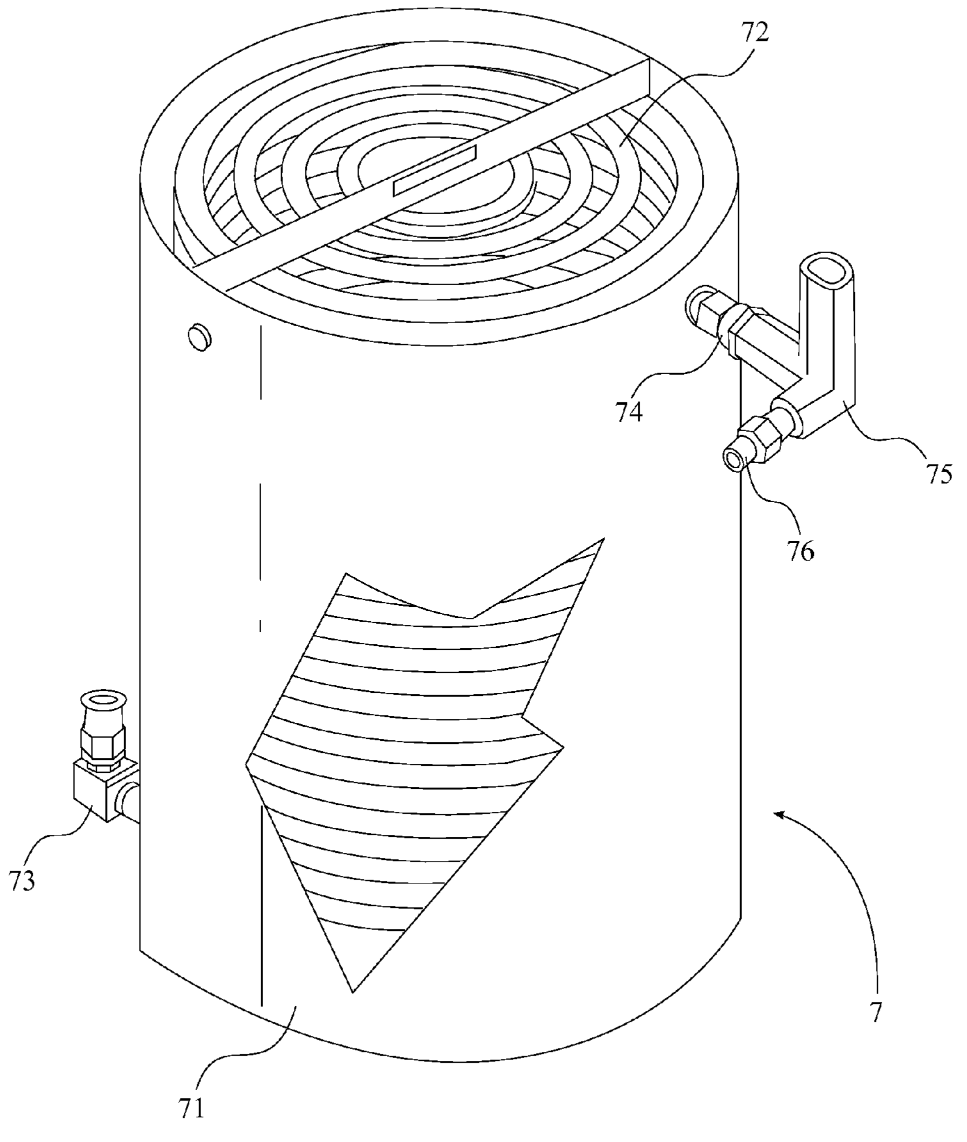
FIG. 5 is a perspective view of the burner assembly of the present invention.

In reference to FIG. 1 and FIG. 5, the burner assembly 7 of the present invention comprises a burner tank 71, the heating coil 72, the bottom inlet 73, a top outlet 74, a relief valve 75, and a water discharge outlet 76. In the preferred embodiment of the present invention, the heating coil 72 is concentrically positioned within the burner tank 71. In alternative embodiments of the present invention, the heating coil can also be positioned in the horizontal or diagonal direction. The bottom inlet 73 is positioned on the burner tank 71 generally toward the lower end of the burner tank 71, and the top outlet 74 is positioned on the burner tank 71 generally toward the upper end of the burner tank 71. The bottom inlet 73 supplies the flow of high pressure cold water into the burner tank 71, and the heating coil 72 converts the flow of high pressure cold water into a flow of high pressure hot water as the heating coil 72 produces thermal energy. The flow of high pressure hot water is able to exit the burner tank 71 though the top outlet 74. The relief valve 75 is in fluid communication with the top outlet 74, and the water discharge outlet 76 is positioned on the relief valve 75. The relief valve 75 allows the present invention to regulate the pressure outside the burner tank 71 as the relief valve 75 automatically opens and relieves dangerous system pressure overloads when necessary. The water discharge outlet 76 provides a port opening so that the coil outlet assembly 9 is able to fluidly connect within the present invention.

Figure 6:
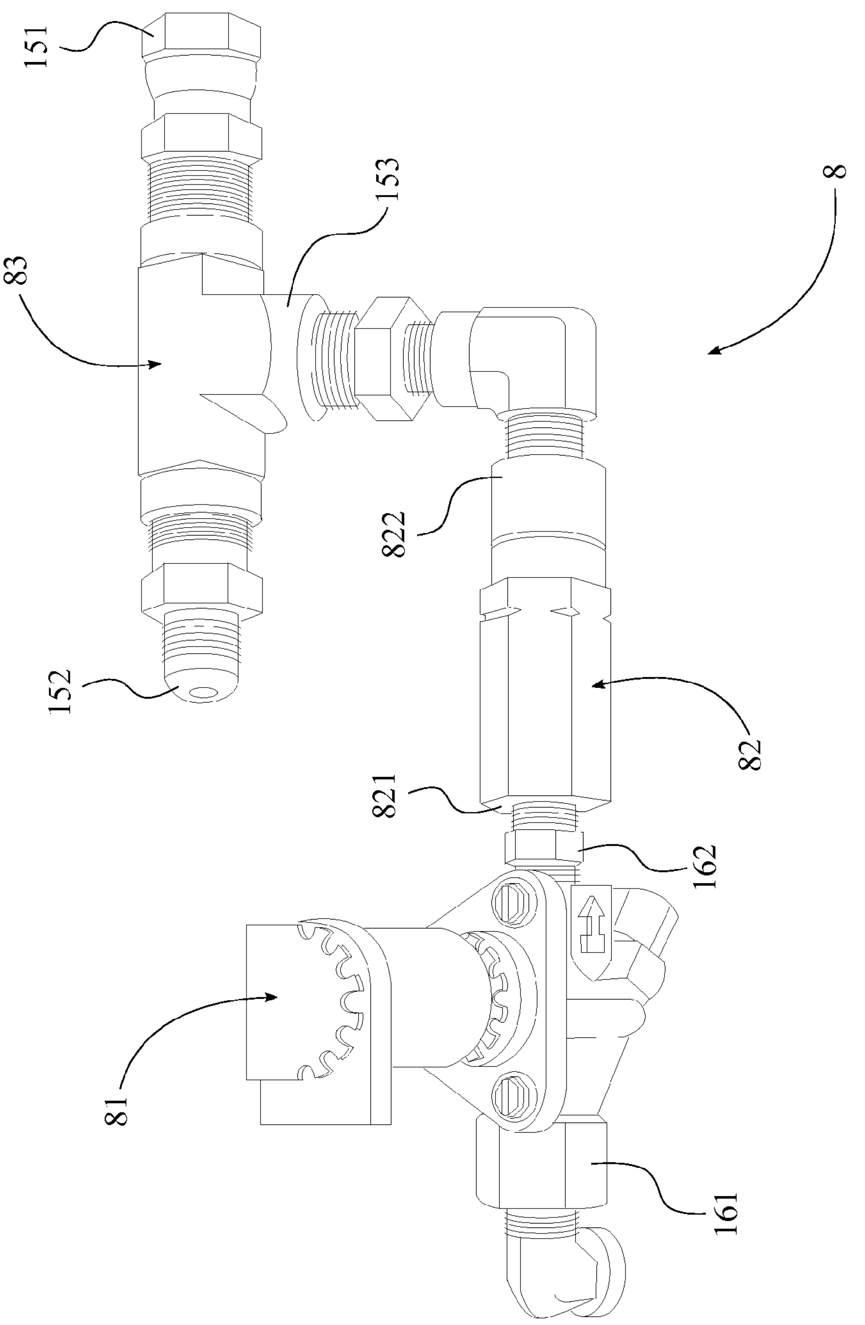
FIG. 6 is a perspective view of the low pressure water supply assembly of the present invention.

In reference to FIG. 1 and FIG. 6, the low pressure outlet 33 is in fluid communication with the low pressure water supply assembly 8 of the present invention, where the low pressure water supply assembly 8 of the present invention comprises a low pressure solenoid valve 81, a check valve 82, and a water supplying t-fitting 83. The low pressure solenoid valve 81 comprises an inflow end 161 and an outflow end 162, where the inflow end 161 and the outflow end 162 are oppositely positioned from each other on the low pressure solenoid valve 81. The check valve 82 comprises a valve inlet 821 and a valve outlet 822, and the valve inlet 821 and the valve outlet 822 are linearly and oppositely positioned from each other on the check valve 82. The water supplying t-fitting 83 comprises a first fitting end 151, a second fitting end 152, and a third fitting end 153. The first fitting end 151 the second fitting end 152 are linearly and oppositely positioned from each other on the water supplying t-fitting 83, and the third fitting end 153 is perpendicularly positioned with the first fitting end 151 and the second fitting end 152 on the water supplying t-fitting 83. The low pressure outlet 33 is in fluid communication with the inflow end 161 of the low pressure solenoid valve 81 so that the low pressure water supply assembly 8 is able to receive the flow of low pressure cold water from the water inlet assembly 3. The outflow end 162 of the low pressure solenoid valve 81 is in fluid communication with the valve inlet 821, and the valve outlet 822 is in fluid communication with the third fitting end 153 of the water supplying t-fitting 83 so that the water supplying t-fitting 83 can be in fluid communication in between the unloader valve 6 and the bottom inlet 73 in such way that the outlet valve port 63 is in fluid communication with the bottom inlet 73 through the first fitting end 151 and the second fitting end 152 of the water supplying t-fitting 83.

Figure 7:
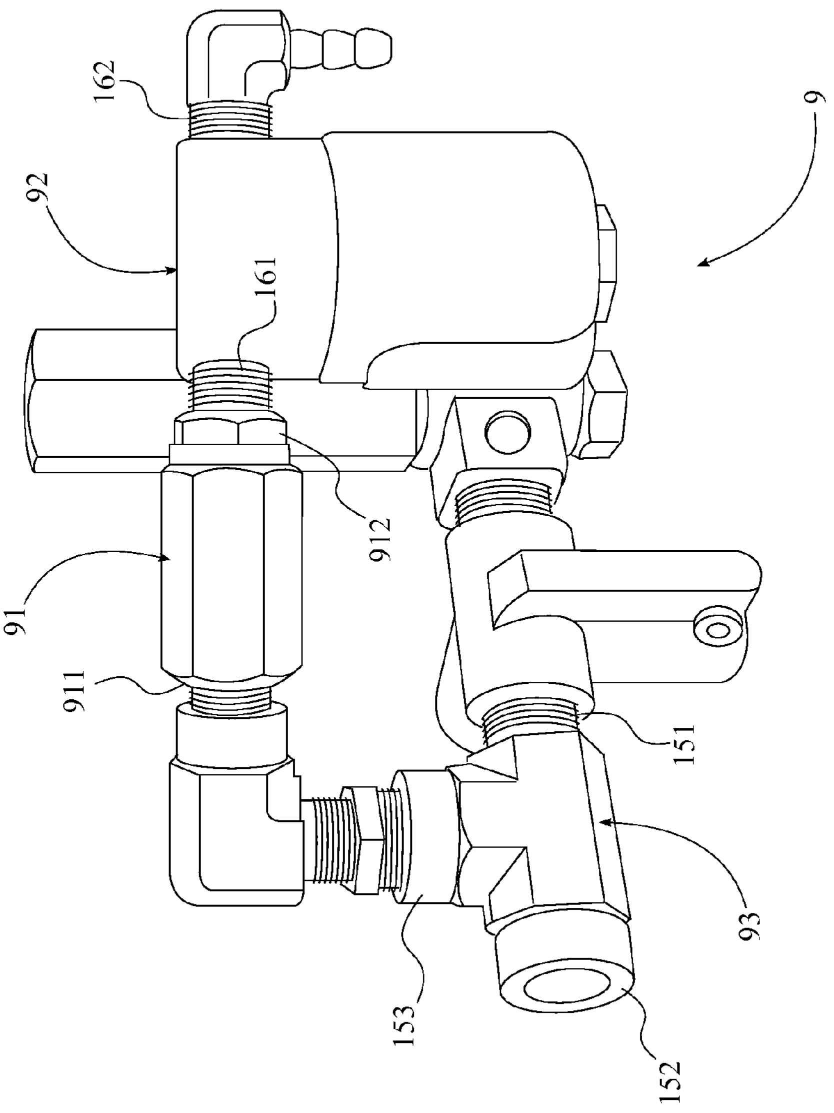
FIG. 7 is a perspective view of the coil outlet assembly of the present invention.

In reference to FIG. 1 and FIG. 7, the water discharge outlet 76 is in fluid communication with the coil outlet assembly 9 of the present invention, where the coil outlet assembly 9 of the present invention comprises a high pressure filter 91, a high pressure solenoid valve 92, a water releasing t-fitting 93, and a discharge hose 94. The high pressure filter 91 comprises a filter inlet 911 and a filter outlet 912, and the filter inlet 911 and the filter outlet 912 are linearly and oppositely positioned from each other on the high pressure filter 91. The high pressure solenoid valve 92 comprises an inflow end 161 and an outflow end 162, where the inflow end 161 and the outflow end 162 are oppositely positioned from each other on the high pressure solenoid valve 92. The high pressure solenoid valve 92 is preferably rated for 5000 psi and 480 degrees of Fahrenheit (° F.), and the orifice is sized to minimize the amount of water used within the high pressure solenoid valve 92. The water releasing t-fitting 93 comprises a first fitting end 151, a second fitting end 152, and a third fitting end 153. The first fitting end 151 the second fitting end 152 are linearly and oppositely positioned from each other on the water releasing t-fitting 93, and the third fitting end 153 is perpendicularly positioned with the first fitting end 151 and the second fitting end 152 on the water releasing t-fitting 93. Within the coil outlet assembly 9, the filter outlet 912 is in fluid communication with the inflow end 161 of the high pressure solenoid valve 92, and the discharge hose 94 is in fluid communication with the outflow end 162 of the high pressure solenoid valve 92. The water discharge outlet 76 of the relief valve 75 is in fluid communication with the first fitting end 151 of the water releasing t-fitting 93 so that the spray gun 2 or the discharge hose 94 are able to receive the flow of high pressure hot water from the burner assembly 7. More specifically, the filter inlet 911 is in fluid communication with the third fitting end 153 of the water releasing t-fitting 93 so that the water supplying t-fitting 83 can supply the flow of high pressure hot water to the discharge hose 94 as the flow of high pressure hot water travels through the filter outlet 912, the inflow end 161 and the outflow end 162 of the high pressure solenoid valve 92. The spray gun 2 is in fluid communication with the second fitting end 152 of the water releasing t-fitting 93 so that the water supplying t-fitting 83 can supply the flow of high pressure hot water to the spray gun 2 when the present invention is operated by the users. The spray gun 2 comprises a trigger, a wand, a pressurized nozzle, and a high pressure hose. The high pressure hose functions as the means for the in fluid communication in between the spray gun 2 and the second fitting end 152 as the high pressure hose attaches to both the spray gun 2 and the second fitting end 152. The trigger is manually operated by the users, where the trigger turns on and off the flow of high pressure hot water as the flow of the high pressure hot water exits through the wand and the pressurized nozzle. The pressurized nozzle controls the shape of the spray pattern and the velocity of the spray. The present invention is equipped with a plurality of pressurized nozzles as each of the pressurized nozzles has its own unique spray patterns and different velocities.

Figure 8:
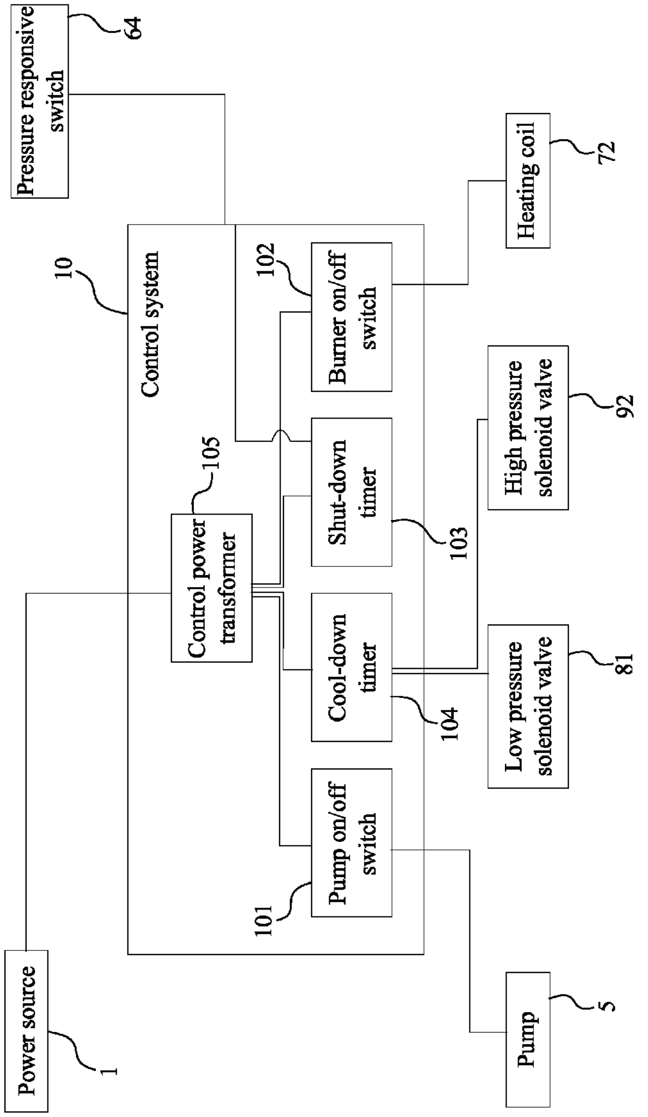
FIG. 8 is a block diagram illustrating the basic electrical connections of the present invention.

In reference to FIG. 8, the control system 10 of the present invention comprises a pump on/off switch 101, a burner on/off switch 102, a shut-down timer 103, a cool-down timer 104, and a control power transformer 105. The pump on/off switch 101 and the burner on/off switch 102 are positioned on the control system 10, and the shut-down timer 103, the cool-down timer 104, and the control power transformer 105 are positioned within the control system 10. The control power transformer 105, which controls the voltage on the present invention, is electrically connected with the power source 1. The power source 1 for the present invention can be an engine or an external electrical power source, where the power source 1 provides necessary power to respective components of the present invention. The control power transformer 105 is electrically connected with the with the pump on/off switch 101, the burner on/off switch 102, the cool-down timer 104, and the shut-down timer 103. The pump on/off switch 101 is electrically connected with the pump 5 and controls by the users of the present invention, where the pump on/off switch 101 turns on and off the pump 5. The burner on/off switch 102 is electrically connected with the heating coil 72 and controls by the users of the present invention, where the burner on/off switch 102 turns on and off the heating coil 72 so that the flow of high pressure cold water can be converted into the flow of high pressure hot water from the produced thermal energy of the heating coil 72. The cool-down timer 104 is electrically connected with the low pressure solenoid valve 81 and the high pressure solenoid valve 92. The cool-down timer 104 controls the low pressure solenoid valve 81 and the high pressure solenoid valve 92 during the cooling down of the heating coil 72. The shut-down timer 104 is electrically connected with the control system 10, and the shut-down timer 104 automatically shuts down the power source for the present invention to prevent excess wear on the pump, excess heat generation, and unnecessary energy consumption if the pressure responsive switch 64 detects any pressure buildup due to stoppage of the flow of high pressure hot water.

Figure 9:
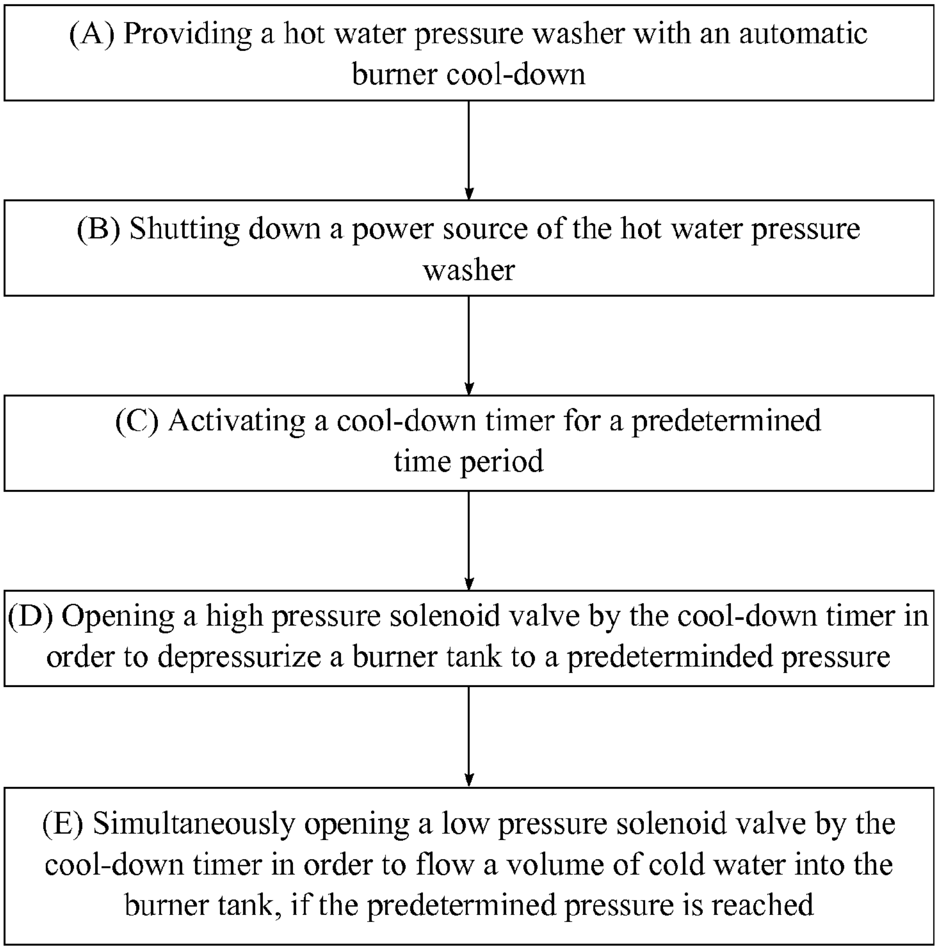
FIG. 9 is a basic flow chart illustrating overall the process for the cooling down of the heating coil of the present invention.
Figure 11:
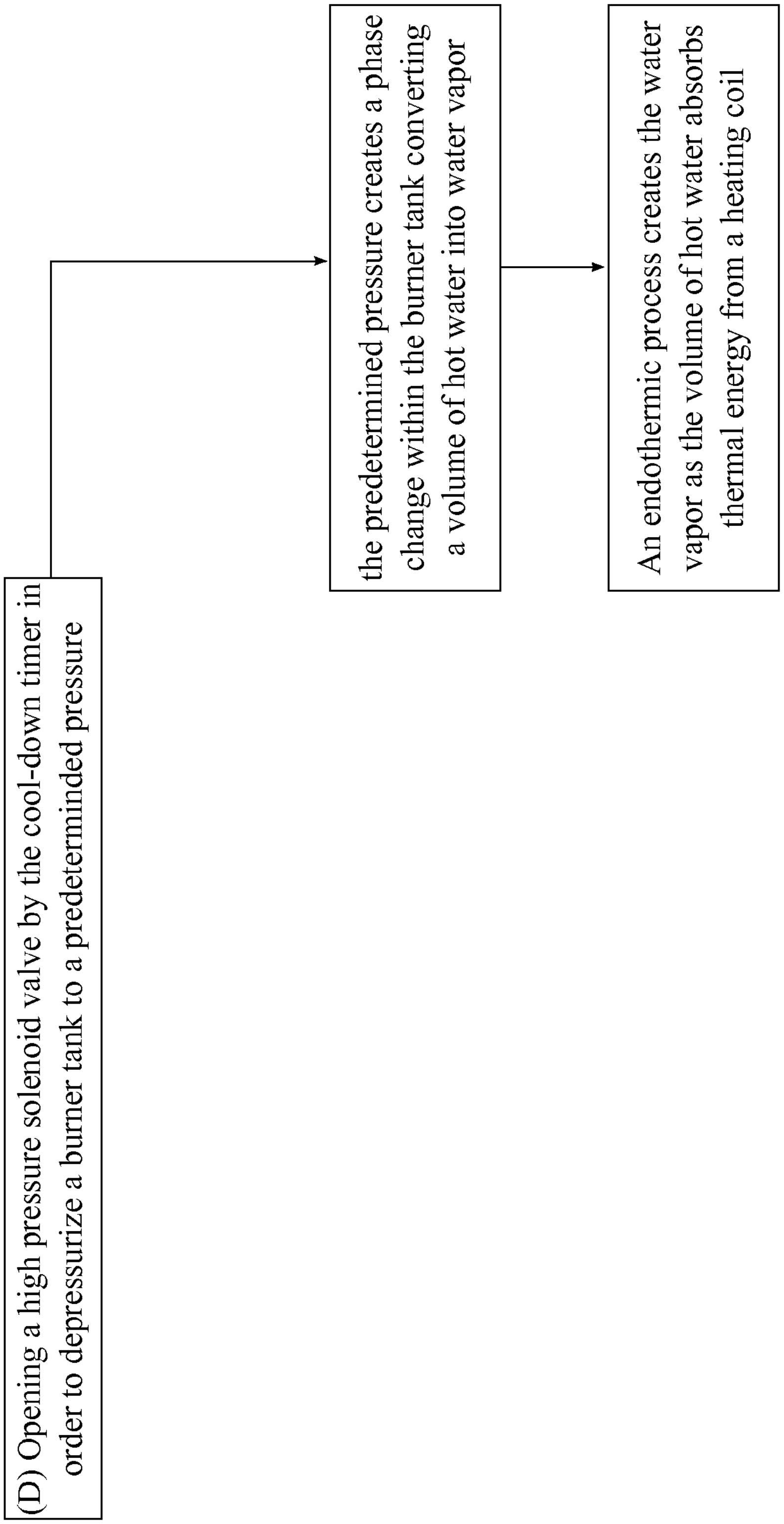
FIG. 11 is a basic flow chart illustrating the results for the opening of the high pressure solenoid valve of the present invention within the overall process.
Figure 12:
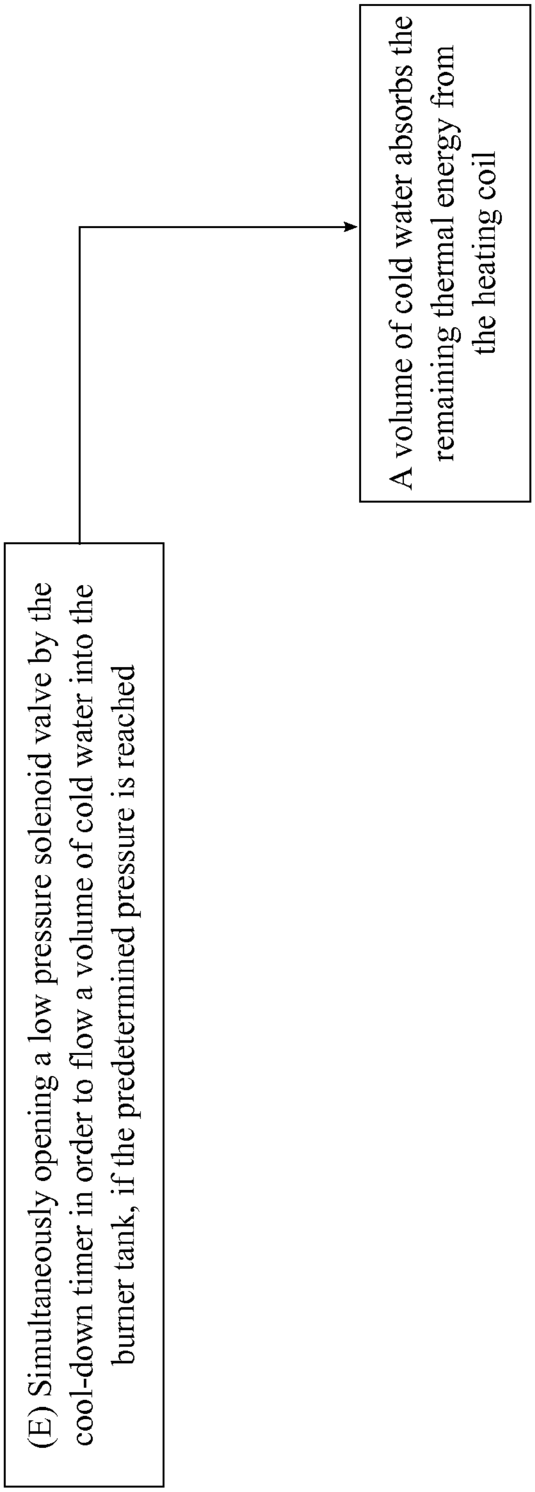
FIG. 12 is a basic flow chart illustrating the result for the opening of the low pressure solenoid valve of the present invention within the overall process.

In reference to FIG. 9 and FIG. 10, the present invention can be shut down with two different procedures. As for the first procedure, the power source 1 of the present invention is automatically shut down through shut-down timer 103 of the control system 10 in such way that the power to the pump 5 and the heating coil 72 is completely turned off. More specifically, when the users of the present invention stop discharging the flow of high pressure hot water through the spray gun 2, the control system 10 detects that the flow of high pressure hot water through the burner assembly 7 is stopped through the pressure responsive switch 64. Once the control system 10 detects the absence of the flow of high pressure hot water, the control system 10 automatically activates the shut-down timer 103 for a preset time period so that the power source 1 to the pump 5 and the heating coil 72 can be shut down. Then the control system 10 shuts down the power to the pump 5 and the heating coil 72 through the shut-down timer 103 if the flow of high pressure hot water is continuously stopped within the preset time period. As for the second procedure, the power source 1 of the present invention is manually shut down through the pump on/off switch 101 and the burner on/off switch 102 as the both switches are individually switched from an on-position to an off-position. Once the present invention is shut down through either the first procedure or the second procedure, the control system 10 activates the cool-down timer 104 for a predetermined time period via a normally closed auxiliary contact on the main magnetic contactor of the control system 10. In reference to FIG. 11 and FIG. 12, the cool-down timer 104 simultaneously opens both the high pressure solenoid valve 92 and the low pressure solenoid valve 81 in order to cool the heating coil 72. The opening of the high pressure solenoid valve 92 decreases the inside pressure of the burner tank 71 to a predetermined pressure just above the atmospheric pressure. At this point, the burner tank 71 is considered as a closed system with a volume of hot water, and the sudden pressure drop creates an endothermic change within the burner tank 71, where the volume of hot water goes though a phase change and converts into water vapor within the burner tank 71. In order for the endothermic change and the phase change to take place within the burner tank 71, the required heat energy is taken from thermal energy contained within the heating coil 72. The endothermic change and the phase change absorb majority of the thermal energy from the heating coil 72 resulting a cool-down of the heating coil 72. The water vapor is then discharged through the discharge hose 94, where the discharge hose 94 can release the water vapor into the float tank 4 if the free end of the discharge hose 94 is in fluid communication with the float tank 4 or can release into the surrounding area if the free end of the discharge hose 94 is positioned away from the present invention. At the same time, the opening of the low pressure solenoid valve 81 supplies a volume of cold water into the burner tank 71 if the predetermined pressure is reached through the high pressure solenoid valve 92. The check valve 82 opens the pathway to the volume of cold water though the third fitting end 153 of the water supplying t-fitting 83 as the pressure with the valve inlet 821 of the check valve 82 is higher than the pressure within the valve outlet 822 of the check valve 82. The volume of cold water then flows through the heating coil 72 and discharges through the discharge hose 94, where the volume of cold water absorbs the remaining thermal energy of the heating coil 72 through convection.

Figure 13:
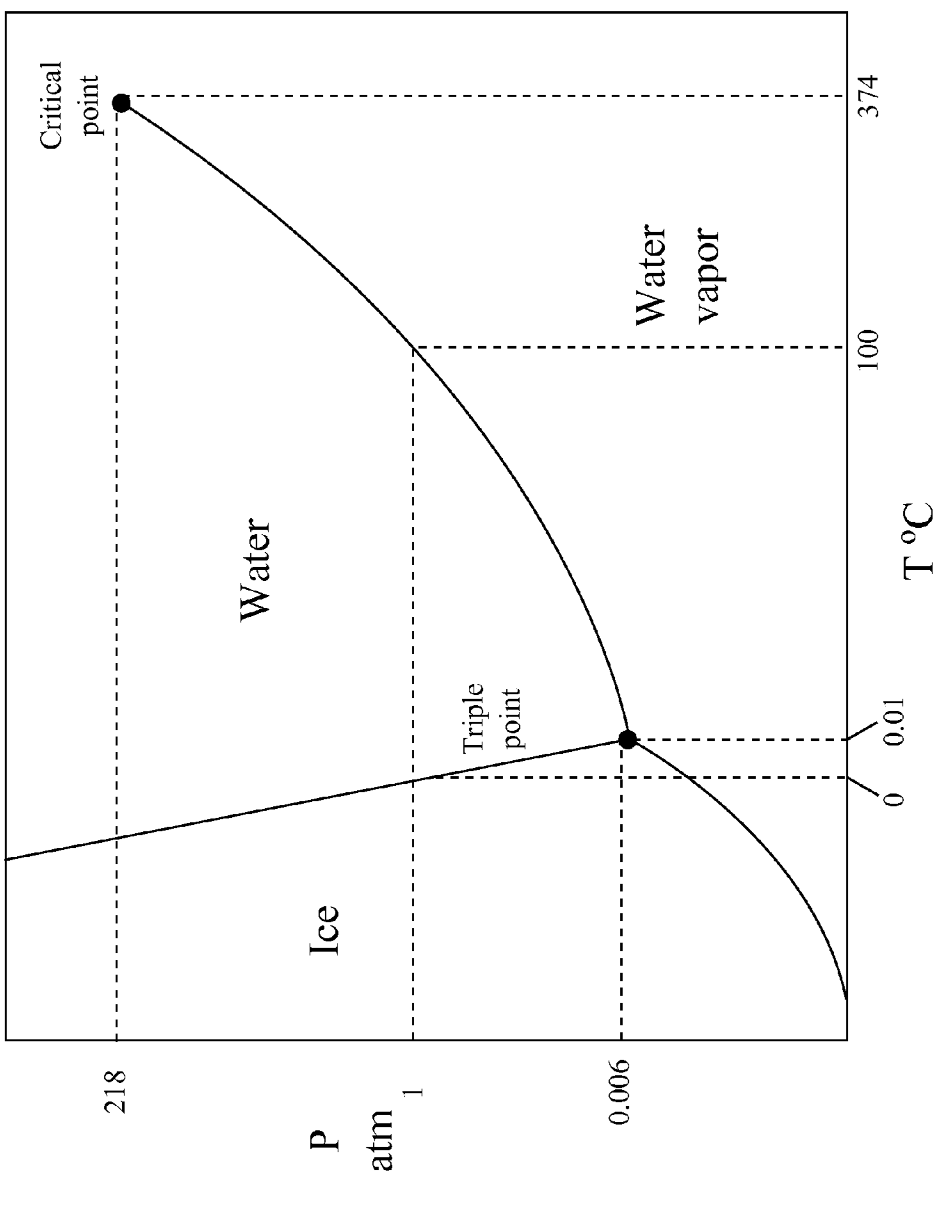
FIG. 13 is an illustration of the graph showing the different phases of a substance at different levels of temperature and pressure for water, water vapor, and ice.

In reference to FIG. 13, increasing the temperature of a system in a dynamic equilibrium favors the endothermic change. In other words, increasing the temperature water increases the amount of vapor present, and so increases the saturated vapor pressure. Following is an example explaining the amount of energy needed to change phase in a volume of water:

It takes 1 British thermal unit (BTU) to raise the temperature of 1 pound (lb) of water 1° F.

Therefore, it would require 162 BTU to raise the temperature of 1 lb of water from 50° F. to 212° F.

To change the same 1 lb of water at 212° F. from a liquid water to water vapor would require 970 BTU.

Thus, amount of energy needed to change phase is 970 times the amount needed to simply raise the temperature 1 degree.

In order to cool down the heating coil of the traditional hot pressure washers, the power to the heating coil is turned off while the cold water is forced through the burner assembly by the pump. This process requires a much greater volume of cold water and additional power to operate the pump as the heat is transferred from the coil to the water at a rate of 1 BTU/lb-° F. The slow process of heat transfer in the traditional hot pressure washers waste both the water and power creating a higher operating cost for the users and inefficient cooling method. The present invention cools down the heating coil 72 through the phase change of the volume of the hot water and the convection heat transfer of the volume of cold water. This process requires less water and does not require the pump 5 to be operational as the majority of heat is transferred from the coil to the volume of hot water at a rate of 970 BTU/lb-° F., and the remaining heat is transferred from the coil to the volume of cold water at a rate of 1 BTU/lb-° F. As a result, the present invention cools down faster and uses less amount of cold water during the cool down process.

Although the invention has been explained in relation to its preferred embodiment, it is to be understood that many other possible modifications and variations can be made without departing from the spirit and scope of the invention as hereinafter claimed.

What is claimed is:

1. An apparatus for hot water pressure washer with an automatic burner cool-down comprises:
- a power source;
- a spray gun;
- a water inlet assembly;
- a float tank;
- a pump;
- an unloader valve;
- a burner assembly;
- a low pressure water supply assembly;
- a coil outlet assembly;
- a control system;
- the water inlet assembly comprises a water inlet, a tank outlet, and a low pressure outlet;
- the pump comprises a pump inlet and a pump outlet;
- the unloader valve comprises a bypass port, an inlet valve port, an outlet valve port, and a pressure responsive switch;
- burner assembly comprises a burner tank, a heating coil, a bottom inlet, a top outlet, a relief valve, and a water discharge outlet;
- the low pressure water supply assembly comprises a low pressure solenoid valve, a check valve, and a water supplying t-fitting;
- the coil outlet assembly comprises a high pressure filter, a high pressure solenoid valve, a water releasing t-fitting, and a discharge hose;
- the water supplying t-fitting and the water releasing t-fitting each comprise a first fitting end, a second fitting end, and a third fitting end;
- the low pressure solenoid valve and the high pressure solenoid valve each comprise an inflow end and an outflow end;
- the check valve comprises a valve inlet and a valve outlet;
- the high pressure filter comprises a filter inlet and a filter outlet; and
- the control system comprises a pump on/off switch, a burner on/off switch, a shut-down timer, a cool-down timer, and a control power transformer.

2. The apparatus for hot water pressure washer with an automatic burner cool-down as claimed in claim 1 comprises:
- the water inlet, the tank outlet, and the low pressure outlet being positioned on the water inlet assembly;
- the pump inlet and the pump outlet being positioned on the pump;
- the bypass port, the inlet valve port, and the outlet valve port being positioned on the unloader valve; and
- the pressure responsive switch being positioned within the unloader valve.

3. The apparatus for hot water pressure washer with an automatic burner cool-down as claimed in claim 1 comprises:
- the heating coil being positioned within the burner tank;
- the bottom inlet being positioned on the burner tank;
- the top outlet being positioned on the heating tank;
- the relief valve being in fluid communication with the top outlet; and
- the water discharge outlet being positioned on the relief valve.

4. The apparatus for hot water pressure washer with an automatic burner cool-down as claimed in claim 1 comprises:
- the inflow end and the outflow end being oppositely positioned on the low pressure solenoid valve;
- the valve inlet and the valve outlet being linearly and oppositely positioned from each other on the check valve;
- the first fitting end and the second fitting end being linearly and oppositely positioned from each other on the water supplying t-fitting;
- the third fitting end being perpendicularly positioned with the first fitting end and the second fitting end on the water supplying t-fitting; and
- the outflow end of the low pressure solenoid valve being in fluid communication with the valve inlet.

5. The apparatus for hot water pressure washer with an automatic burner cool-down as claimed in claim 1 comprises:
- the tank outlet being in fluid communication with the floating tank;
- the floating tank being in fluid communication with the pump inlet;
- the pump outlet being in fluid communication with the inlet valve port;
- the bypass port being in fluid communication with the pump inlet; and the outlet valve port being in fluid communication with the bottom inlet through the first fitting end and the second fitting end of the water supplying t-fitting.

6. The apparatus for hot water pressure washer with an automatic burner cool-down as claimed in claim 1 comprises:

the low pressure outlet being in fluid communication with the inflow end of the low pressure solenoid valve; and the valve outlet being in fluid communication with the bottom inlet through the third fitting end of the water supplying t-fitting.

7. The apparatus for hot water pressure washer with an automatic burner cool-down as claimed in claim 1 comprises:

the inflow end and the outflow end being oppositely positioned on the high pressure solenoid valve;

the filter inlet and the filter outlet being oppositely positioned from each other on the high pressure filter;

the first fitting end and the second fitting end being linearly and oppositely positioned from each other on the water releasing t-fitting;

the third fitting end being perpendicularly positioned with the first fitting end and the second fitting end on the water releasing t-fitting;

the filter outlet being in fluid communication with the inflow end of the high pressure solenoid valve; and the discharge hose being in fluid communication with the outflow end of the high pressure solenoid valve.

8. The apparatus for hot water pressure washer with an automatic burner cool-down as claimed in claim 1 comprises:

the first fitting end of the water releasing t-fitting being in fluid communication with the water discharge outlet;

the spray gun being in fluid communication with the second fitting end of the water releasing t-fitting; and the filter inlet being in fluid communication with the third fitting end of the water releasing t-fitting.

9. The apparatus for hot water pressure washer with an automatic burner cool-down as claimed in claim 1 comprises:

the pump on/off switch and the burner on/off switch being positioned on the control system;

the cool-down timer, the shut-down timer, and the control power transformer being positioned within the control system;

the control power transformer being electrically connected with the power source; and the control power transformer being electrically connected with the pump on/off switch, the burner on/off switch, the cool-down timer, and the shut-down timer.

10. The apparatus for hot water pressure washer with an automatic burner cool-down as claimed in claim 1 comprises:

the low pressure solenoid valve being electrically connected with the cool-down timer;

the high pressure solenoid valve being electrically connected with the cool-down timer;

the pump on/off switch being electrically connected with the pump;

the burner on/off switch being electrically connected with the heating coil;

the shut-down timer being electrically connected with the control system; and the pressure responsive switch being electrically connected with the control system.

11. A method of cooling-down the automatic burner of hot water pressure washer comprises the steps of:

(A) providing a hot water pressure washer with an automatic burner cool-down, wherein the hot water pressure washer with an automatic burner cool-down comprises a water inlet assembly and a low pressure water supply assembly, a burner assembly and a coil outlet assembly with a flow of high pressure hot water, and a control system;

(B) shutting down a power source of the hot water pressure washer with an automatic burner cool-down;

(C) activating a cool-down timer of the control system for a predetermined time period;

(D) opening a high pressure solenoid valve of the coil outlet assembly by the cool-down timer in order to depressurize a burner tank of the burner assembly to a predetermined pressure, wherein the burner tank is filled with a volume of hot water; and (E) simultaneously opening a low pressure solenoid valve of the low pressure water supply assembly by the cool-down timer in order to flow a volume of cold water into the burner tank, if the predetermined pressure is reached.

12. The method of cooling-down the automatic burner of hot water pressure washer as claimed in claim 11, wherein step (B) comprises the steps of:

detecting the flow of high pressure hot water through the burner assembly is stopped;

automatically activating a shut-down timer of the control system for a preset time period in order to shut down the power source; and shutting down the power source through the shut-down timer, if the flow of high pressure hot water is continuously stopped within the preset time period.

13. The method of cooling-down the automatic burner of hot water pressure washer as claimed in claim 11, wherein step (B):

a pump on/off switch of the control system is switched to an off-position.

14. The method of cooling-down the automatic burner of hot water pressure washer as claimed in claim 11, wherein step (D):

the predetermined pressure creates a phase change within the burner tank converting the volume of hot water into water vapor; and an endothermic process creates the water vapor as the volume of hot water absorbs thermal energy from a heating coil of the burner assembly.

15. The method of cooling-down the automatic burner of hot water pressure washer as claimed in claim 11, wherein step (E):

the volume of cold water absorbs the remaining thermal energy from the heating coil.

* * * * *